US011875392B1

(12) United States Patent
Freed et al.

(10) Patent No.: US 11,875,392 B1
(45) Date of Patent: Jan. 16, 2024

(54) METHOD AND SYSTEM FOR DETERMINING AND PRESENTING INFORMATION RELATED TO A SEMANTIC CONTEXT OF ELECTRONIC MESSAGE TEXT OR VOICE DATA

(71) Applicant: Amazon Technologies, Inc., Seattle, WA (US)

(72) Inventors: Ian W. Freed, Seattle, WA (US); Samuel Scott Gigliotti, Seattle, WA (US); Michael M. George, Mercer Island, WA (US); Jessica Nicole Jenks, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1071 days.

(21) Appl. No.: 14/582,072

(22) Filed: Dec. 23, 2014

(51) Int. Cl.
*G06Q 30/0601* (2023.01)
*G06Q 20/36* (2012.01)
(Continued)

(52) U.S. Cl.
CPC ......... *G06Q 30/0631* (2013.01); *G06F 40/30* (2020.01); *G06F 40/40* (2020.01);
(Continued)

(58) Field of Classification Search
CPC ............. G06Q 30/0631; G06Q 10/107; G06Q 20/367; G06F 17/2785; G06F 17/28
(Continued)

(56) References Cited

U.S. PATENT DOCUMENTS

2010/0217603 A1* 8/2010 Hammond ........ G06F 17/30401
704/270.1
2012/0030210 A1* 2/2012 Sankhla ................ G06F 16/335
707/741
(Continued)

FOREIGN PATENT DOCUMENTS

WO    WO-2010017596 A1 *   2/2010   ............. G06Q 30/00

OTHER PUBLICATIONS

McDowell, L.K. 2004, Meaning for the masses: Theory and applications for Semantic Web and Semantic email systems, University of Washington (Year: 2004).*

*Primary Examiner* — Matthew E Zimmerman
*Assistant Examiner* — Latasha D Ramphal
(74) *Attorney, Agent, or Firm* — Eversheds Sutherland (US) LLP

(57) ABSTRACT

Systems, methods, and computer-readable media are disclosed for processing input data to determine an entity such as a product, service, user profile, etc. referenced in or otherwise relevant to a semantic context of the input data. Information related to the entity may be provided as an information package (e.g., a card) that is shareable as part of an electronic message. The card may include a representation of a network resource identifier that identifies a network resource, a network location of the network resource, and an access mechanism for accessing a representation (e.g. a product detail page) of the network resource. The network resource identifier may include one or more tags or tokens that identify an electronic messaging application provider and/or a user such as a sender or recipient of an electronic message that includes the card so as to enable compensating the provider and/or the user for a purchase of a product or service to which the card relates.

14 Claims, 8 Drawing Sheets

(51) Int. Cl.
    *G06Q 10/107*     (2023.01)
    *G06Q 50/00*      (2012.01)
    *G06F 40/30*      (2020.01)
    *G06F 40/40*      (2020.01)

(52) U.S. Cl.
    CPC ......... *G06Q 10/107* (2013.01); *G06Q 20/367* (2013.01); *G06Q 20/3674* (2013.01); *G06Q 30/0623* (2013.01); *G06Q 50/01* (2013.01)

(58) Field of Classification Search
    USPC .................................................. 705/26–27
    See application file for complete search history.

(56) References Cited

U.S. PATENT DOCUMENTS

| | | | |
|---|---|---|---|
| 2015/0081272 A1* | 3/2015 | Kamatani | G06F 40/284 704/2 |
| 2015/0088684 A1* | 3/2015 | Nygaard | G06Q 30/0282 705/26.7 |
| 2015/0100894 A1* | 4/2015 | Kumar | H04L 51/42 715/752 |
| 2015/0149182 A1* | 5/2015 | Kalns | G10L 15/18 704/275 |

* cited by examiner

METHOD AND SYSTEM FOR DETERMINING AND PRESENTING INFORMATION RELATED TO A SEMANTIC CONTEXT OF ELECTRONIC MESSAGE TEXT OR VOICE DATA

BACKGROUND

Users engage in electronic messaging conversations regarding a variety of topics. On occasion, such topics may reference products or services that may be available for online purchase. For example, if a product or service is mentioned in an electronic messaging conversation, a user desiring to learn more about the product or service, and potentially make a purchase, may need to independently initiate an online search for the product or service.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
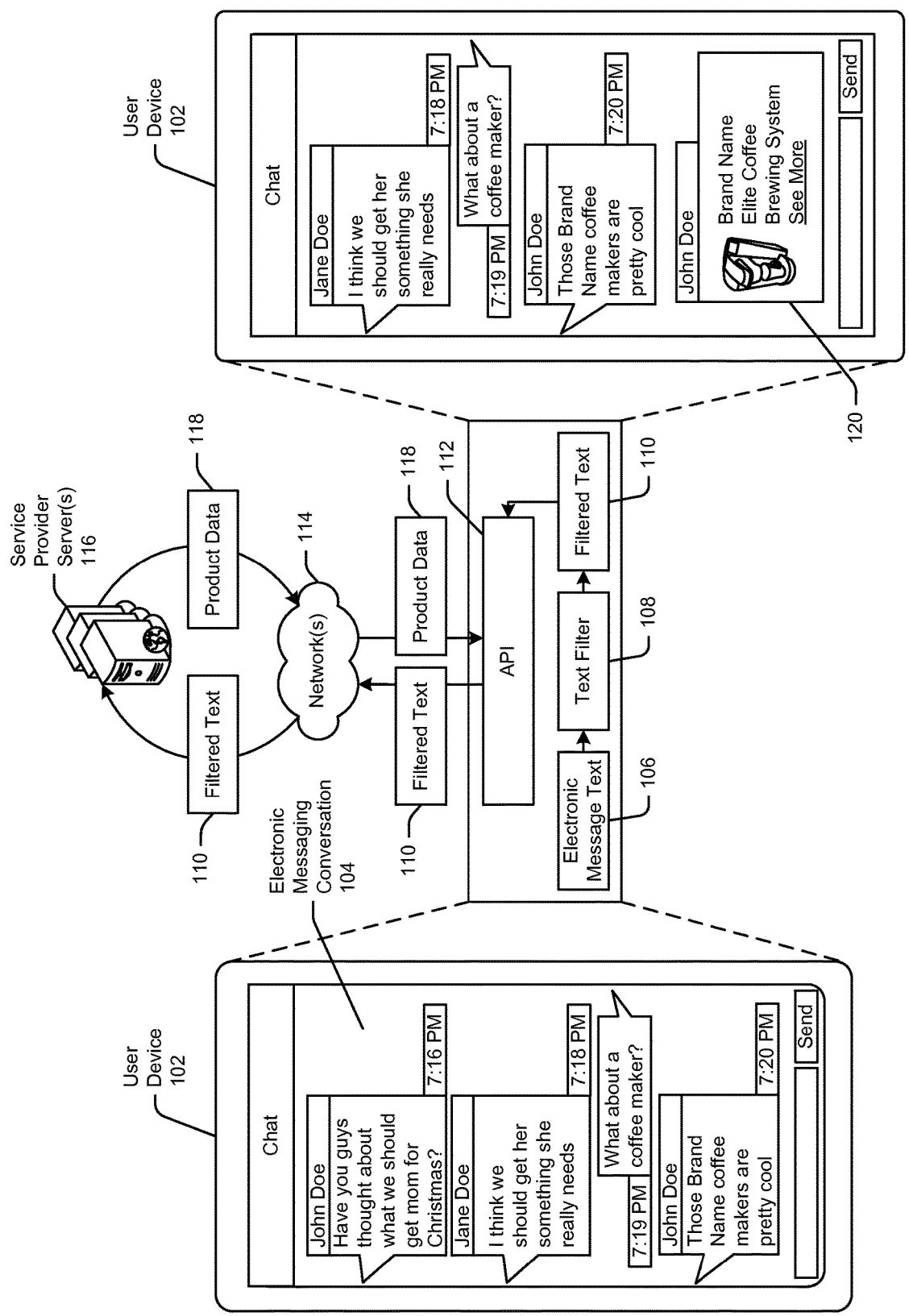
FIG. 1A is a schematic diagram illustrating the i) filtering and processing of electronic message text to identify a product referenced in the electronic message text and ii) the presentation of product data for the product in an electronic message sent to one or more recipients in accordance with one or more example embodiments of the disclosure.

This disclosure relates to, among other things, systems, methods, computer-readable media, techniques, and methodologies for receiving input data in the form of electronic message text or voice data, processing the input data to determine one or more candidate products, services, or other entities referenced in or otherwise relevant to a semantic context of the input data, and sending information related to the one or more candidate entities to one or more user devices to enable sharing of the information by, for example, inclusion of the information in an electronic message sent to one or more recipients. Input data in the form of electronic message text may include, without limitation, an instant message, a short message service (SMS) message, an e-mail message, a message sent via a social networking platform, or the like. Further, while example embodiments of the disclosure may be described in the context of products that are referenced in or otherwise relevant to a semantic context indicated by input data, it should be appreciated that such embodiments are also applicable to services, online user profiles, consumable content, or any other suitable entity.

In an example embodiment, electronic message text may be processed to determine a product or service referenced in the electronic message text or a set of one or more candidate products or services relevant to a semantic context of the text, and information associated with the product(s) or service(s) may be transmitted to one or more user devices to enable sharing of the information. In an example embodiment, natural language processing may be applied to electronic message text to determine that a specific type of product manufactured by a particular manufacturer is mentioned in the text, in which case, product data for the specific product may be transmitted to one or more user devices to enable sharing of the product data between various users via inclusion of the product data in, for example, an electronic message such as an instant message, an SMS message, e-mail message, a social networking post, or the like. Alternatively, a keyword search of the electronic message text may be performed to identify a specific product or product type referenced in the text. If multiple different potential products are relevant to a specific product type manufactured by a particular manufacturer (e.g., High Definition (HD) televisions made by Company A), product data for each such potential product may be transmitted to one or more user devices. The product data may be presented in the form of a user interface object (e.g., a card) that may present data indicative of attributes of a product (e.g., descriptive information about the product) and one or more selectable links that may enable an application (e.g., a browser application, a dedicated mobile application, a social networking application, etc.) to access a representation of a network resource (e.g., a landing page such as a product detail page) that provides additional information pertaining to the product (e.g., pricing information, customer reviews, etc.) and/or via which a purchase of the product may be initiated.

In another example embodiment, electronic message text may be processed to determine that the text includes a predetermined indicator of a specific request for data relating to one or more products or services. The indicator may be any suitable character, symbol, or the like. For example, one or more servers may perform natural language processing on text appearing after the indicator in the electronic message in order to determine a semantic context of the text and one or more candidate products or services corresponding to the semantic context. In certain example embodiments, the semantic context of the text may indicate an intended meaning of the text, a subject matter discussed in the text, a request for information embodied in the text, and so forth. Further, in certain example embodiments, the one or more candidate products or services may be identified from a predetermined group of products or services available for sale and purchase via an electronic marketplace.

In certain example embodiments, multiple indicators may be provided that identify electronic message text contained within the indicators as text to be processed to identify one or more candidate products or services. The natural language processing may further reveal one or more product or service filtering criteria specified in the text appearing after the indicator or within multiple indicators. The product or service filtering criteria may be used to identify candidate products or services that satisfy the filtering criteria. For example, electronic message text may include the indicator '*' followed by the text "best-selling televisions." The electronic message text may be processed to detect the indicator '*' and to determine a product type referenced in the text following the indicator. The processing may further identify filtering criteria (e.g., "best-selling") to be applied in determining a set of candidate products that correspond to the product type and that satisfy the filtering criteria. It should be appreciated that any of a variety of types of filtering criteria may be specified. As another example, the filtering criteria specified in the text following the indicator may include "lowest priced," "best reviewed," or the like. In certain example embodiments, contextual data may be used to further narrow the set of candidate products. For example, geo-location data, time of day data, time of year data, etc. may be used to further filter the set of candidate products. Product data corresponding to the set of candidate products (e.g., one or more product cards) may then be transmitted to one or more user devices to enable sharing of the product data. In alternative example embodiments, the set of candidate products or services may be identified by initiating an automated online search using the text appearing after the indicator. In certain example embodiments, the product data may be presented as audible output from a speaker of a user device or from a speaker of a separate virtual assistant (VA) device.

In another example embodiment, a user may provide voice input in the form of, for example, a voice command that corresponds to a request for data relating to one or more products or services. The voice input may be received by a VA device. For example, a selectable widget may be provided within an electronic messaging application that is responsive to selection causes a VA device to initiate listening for voice input. Functionality of the VA device may be incorporated into a user device such as a smartphone, tablet, or other user devices such that the user device and the VA device constitute a same device. In other example embodiments, the VA device may be a separate device from the user device that is used to engage in the electronic messaging conversation. One or more servers may perform natural language processing on the voice input received by the VA device to determine one or more candidate products or services relevant to a semantic context of the voice input. Data relating to the identified candidate products or services may then be sent to one or more user devices via, for example, the VA device. Alternatively, the VA device may provide audible output of the data.

As previously noted, the data relating to one or more candidate products or services identified by processing electronic message text may be presented in the form of one or more cards. In certain example embodiments, a card may be automatically inserted into an electronic messaging conversation such that each participant in the conversation may independently interact with and share the card. In certain other example embodiments, a card may be sent to a sender of an electronic message based on which the product(s) or service(s) to which the card pertains were identified. The sender may have the capability to insert the card into an electronic message sent to one or more recipients. A single card may correspond to multiple products or services (e.g., a single card for the top five best-selling 4K televisions). In other example embodiments, a respective card may be provided for each of one or more products or services. In the case of a product card, the product data presented via a card may include a variety of types of product data (e.g., a product name, a product image, etc.) as well as a selectable widget (e.g., hyperlinked anchor text) that when selected directs an application executing on a user device (e.g., a browser application, a dedicated mobile application, etc.) to a representation of a network resource (e.g., a landing page) for obtaining additional product information and via which a purchase of the product may be initiated. The product data received for an identified candidate product may include a uniform resource identifier (URI) or other network resource identifier that identifies the network resource described above.

In an example embodiment, a group of two or more users may be engaged in an electronic messaging conversation using an electronic messaging application executable on their respective user devices. The electronic messaging application may be, for example, an SMS messaging application, an instant messaging application, or the like. The electronic messaging application may be a distributed application that includes a client-side component for providing a set of user interfaces via which users may initiate electronic messaging conversations and generate electronic messages as well as a server-side component for maintaining user session states and relaying electronic messages between senders and recipients.

A filter that includes computer-executable code for filtering electronic message text in accordance with one or more filtering criteria may be provided (e.g., embedded) in the client-side component of the electronic messaging application and/or the server-side component. Alternatively, the filter may be provided as part of a back-end service such as a Web service. The filter may receive electronic message text from any number of electronic messages as input and may determine which electronic message text satisfies one or more filtering criteria. The filtering criteria may include, for example, whether the electronic message text of an electronic message includes at least a predetermined number of characters, whether the electronic message text of an electronic message includes a threshold number of predetermined keywords or phrases, and so forth. The predetermined keywords or phrases may include words or phrases corresponding to product types (e.g., coffee makers), words or phrases corresponding to manufacturer names, and so forth. By providing such a filter, those electronic messages that meet a threshold likelihood of referencing a specific product or type of product or otherwise being relevant to a type of product may identified, and thus, the amount of electronic message text submitted for additional processing may be reduced.

Upon application of the filter, electronic message text that satisfies the filtering criteria may be transmitted by the electronic messaging application to one or more servers for additional processing of the text. In certain example embodiments, a token associated with a sender of an electronic message may be transmitted in connection with transmission of the electronic message for additional processing. Further, in certain example embodiments, a respective token associated with each participant in an electronic message conversation may be sent in connection with transmission of corresponding electronic messages from the conversation. The additional processing performed by the one or more servers may include, for example, natural language processing of the electronic message text to identify a product referenced in the text. In certain example embodiments, a type of product may be identified, in which case, additional customer data (e.g., purchase data, search/browsing data, etc.) may, if available, be used to identify a specific product produced by a specific manufacturer. In other example embodiments, a specific product corresponding to a product type identified from the electronic message text may be determined based on other available data such as customer review data, pricing data, and so forth. Further, in certain other example embodiments, a set of candidate products may be identified by the natural language processing performed on the electronic message text. The set of candidate products may be selected from a predetermined group of products available for sale via an electronic marketplace such as an online store, via a brick-and-mortar establishment, or the like. In addition, as previously described, the electronic message text may include one or more indicators that identify text to be processed to determine a set of one or more candidate products.

Product data for the product identified from the processing of the electronic message text may then be generated or retrieved from data stored in one or more datastores. In those example embodiments in which a set of candidate products are identified, product data for one or more such products may be generated. The product data may include, for example, a product name, a manufacturer name, a product image, or the like. The product data may further include a URI (e.g., a uniform resource locator (URL)) that may identify a network resource and enable access to a representation of the network resource such as a product detail page or other landing page via which additional product information may be obtained and a purchase of the product may be initiated.

A representation of the product data may be generated. For example, the product data may be embodied in a product card that may be inserted into an electronic message from a sender to a recipient. In certain example embodiments, the electronic messaging application may receive the product data and surface the corresponding product card to a sender or recipient of the electronic message, which was processed to identify the product. In other example embodiments, a product may be identified based on natural language processing performed on a group of electronic messages within an electronic messaging conversation, in which case, the product card may be presented to one or more participants in the electronic messaging conversation. In certain example embodiments, static product information (such as the types of information described above) may be included in the product data, while dynamic product information (e.g., pricing information, customer review information, etc., which may change over time) may be excluded from the product card. By excluding dynamic product information from the product card, the information presented in the card may remain up-to-date despite prolonged presence of the card within a message stream.

In certain example embodiments, the URI included in the product data may include a reference tag uniquely associated with a provider of the electronic messaging application. Further, in certain example embodiments, the URI may include one or more user tokens, each of which may uniquely identify a sender or recipient of the electronic message from which the product was identified. In those example embodiments in which a user logs into the electronic messaging application using authentication credentials associated with a service provider system that hosts a landing page identified by the URI, a sender and/or recipient may be known to the service provider system, and thus, the service provider system may generate a corresponding one or more user tokens included in the URI. It should be appreciated that the service provider system may include a first set of one or more servers configured to perform natural language processing on electronic message text, a second set of one or more servers configured to generate product or service data including a URI having a reference tag and/or user token(s) embedded therein, and a third set of one or more servers hosting the network resource (e.g., a landing page such as a product or service detail page) identified by the URI. It should further be appreciated that the first set of server(s), the second set of server(s), and the third set of server(s) may include one or more same servers.

In other example embodiments, the sender and/or recipient of an electronic message that includes text from which a product is identified may not be known. In such example embodiments, the electronic messaging application may generate corresponding user token(s) and provide the token(s) to the service provider system. A token generated by the electronic messaging application may be provided to the service provider system in association with the electronic message from/to the corresponding sender/recipient (e.g., in a same data package).

A product card surfaced to a participant within an electronic messaging application may be sent within an electronic message to one or more other participants in an electronic messaging conversation from which the corresponding product was identified and/or to one or more other recipients. Upon receipt of the product card, a recipient may select a selectable widget (e.g., hyperlinked anchor text) which may cause an application (e.g., a web browser, a mobile browser, a dedicated mobile application, etc.) executing on a user device associated with the recipient to be directed to a representation of the network resource identified by the URI that was included in the product data embodied by the product card. Upon the application being directed to, for example, a product detail page for the product, an application session may be established between a server hosting the landing page and the application. The recipient may then initiate and complete a purchase of the product during the application session.

Upon completion of the purchase, the service provider system may attribute the purchase to a provider of the electronic messaging application based on the reference tag included in the URI that was used to direct an application executing on the recipient's device to the product detail page. Compensation data that indicates an amount of compensation to the provider for the product purchase may then be generated and transmitted to a system that hosts the server-side component of the electronic messaging application. Similarly, if a user token included in the URI is associated with a user who is known to the service provider system, the product purchase may be attributed to that user and compensation data that indicates an amount of compensation to the user may be generated and associated with the user's account maintained by the server provider system. As previously noted, the user may be a sender or recipient of an electronic message that includes the product card.

In those example embodiments in which the user token was provided by the electronic messaging application, and thus, the user corresponding to the user token is not known to the service provider system, the token may be transmitted to the electronic messaging application along with an indication that the product purchase has been attributed to the token. The server-side component of the electronic messaging application may then determine a user's account associated with the token, and itself generate compensation data indicating an amount of compensation to be awarded to the user. The compensation data may be associated with the user's account maintained by the electronic messaging application server. The compensation may take on any suitable form, including, but not limited to, monetary compensation, rewards points, etc.

In certain other example embodiments, a user token associated with a user who is not known to the service provider system may be transmitted to the electronic messaging application, and the electronic messaging application may identify the user based on the user token. The electronic messaging application may then transmit other identifying information for the user (e.g., user's name, e-mail address, etc.) to the service provider system. The service provider system may use this identifying information to locate a corresponding account of the user with the service provider system, and may generate and associate compensation data with the user's account maintained by the service provider system.

Example embodiments of the disclosure provide a number of technical features or technical effects. For example, in accordance with example embodiments of the disclosure, products, services, user profiles, and so forth may be identified through filtering and processing (e.g., natural language processing) of electronic message text, and data corresponding to the identified products, services, user profiles, or the like may be sent to one or more user devices to enable sharing of the data via, for example, one or more electronic messages. Further, the data may be embodied in the form of a card that may be included in an electronic message from a sender to a recipient, a recipient may be directed to a representation of a network resource via interaction with the card, and if the recipient completes a purchase, the purchase may be attributed to a provider of the electronic messaging application, a sender of the electronic message that includes the card, or a recipient of the electronic message by using a reference tag and/or a user token forming part of a network resource identifier that identifies the network resource. Accordingly, in this manner, product or service purchases may be facilitated from within an electronic messaging application, and such purchases may be incentivized by providing compensation for such purchases to the electronic messaging application provider and/or the sender and/or recipient of an electronic message that includes a card that enables the purchase. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Cases

FIG. 1A is a schematic diagram illustrating the filtering and processing of electronic message text to identify a product referenced in the electronic message text and the presentation of product data for the product in an electronic message sent to one or more recipients in accordance with one or more example embodiments of the disclosure.

As shown in FIG. 1A, a user device 102 may be provided. The user device 102 may be any suitable mobile, desktop, or laptop device including, but not limited to, a smartphone, tablet, wearable computing device, desktop computer, or laptop computer. An electronic messaging application may be executable on the user device 102. More specifically, a client-side component of the electronic messaging application may execute on the user device 102 and may interact with a corresponding server-side component executing on one or more electronic messaging application servers (not shown in FIG. 1A.).

An example electronic messaging conversation 104 is shown as being displayed on the user device 102. Any number of participants may be included in the electronic messaging conversation 104, with each participant transmitting zero or more electronic messages to the other participants in the conversation. The electronic messages may include electronic message text 106 that may be provided to a text filter 108. The filter 108 may include computer-executable code that may be embedded in or otherwise associated with the client-side component of the electronic messaging application. Alternatively, the filter 108 may form part of a server-side component of the electronic messaging application, a back-end service, or the like. The filter 108 may include one or more software algorithms for filtering the electronic message text 106 based on one or more filtering criteria. For example, the filter 108 may filter the electronic message text 106 to identify those messages that include at least a predetermined number of characters. Additionally, or alternatively, the filter 108 may identify those electronic messages that include predetermined keyword or phrases. It should be appreciated that any suitable filtering criteria may be used. Further, the filter 108 may be updated periodically to reflect updated filtering criteria (e.g., additional keywords or phrases, updated character threshold limits, etc.).

The filter 108 may generate output data that includes filtered text 110 corresponding to electronic messages that satisfy the filtering criteria. In certain example embodiments, no electronic message text 106 may satisfy the filtering criteria, in which case, the filter 108 may generate output data indicating the absence of filtered text 110. Assuming that the output data generated by the filter includes filtered text 110, the filtered text 110 may then be transmitted to one or more service provider servers 116 via one or more networks 114 using an application programming interface (API) 112. In certain example embodiments, a respective user token corresponding to each sender or recipient of each electronic message to which the filtered text 110 corresponds may also be transmitted to the service provider server(s) 116. In other example embodiments, a respective user token corresponding to each of one or more participants in an electronic messaging conversation to which the filtered text 110 pertains may be sent to the service provider server(s) 116.

Upon receipt of the filtered text 110 corresponding to one or more electronic messages, the service provider server(s) 116 may execute one or more natural language processing algorithms on the filtered text 110 to identify one or more products referenced in the filtered text 110 and/or one or more products that are relevant to a semantic context of the filtered text 110. In certain example embodiments, a specific product made by a specific manufacturer may be identified, while in other example embodiments, a type of product may be identified and a specific product made by a specific manufacturer may be determined based on customer data that may be available for the sender, customer review data, pricing data, or the like. In addition, in certain example embodiments, a set of candidate products may be identified based on the natural language processing of the filtered text 110.

Upon determining a product, the service provider server(s) 116 may generate product data 118 for the product. The product data 118 may include, without limitation, a product name, a product manufacturer, a product image, or the like. It should be appreciated that at least some of this information may be pre-existing and may be retrieved by the service provider server(s) 116 upon determining the product. The product data 118 may further include a URI or other network resource identifier that identifies a network resource and enables access to a representation (e.g., a product detail page for the product) of the network resource that provides additional product information for the product and via which a user may initiate a purchase of the product. As described earlier, the URI may further include a reference tag associated with the electronic messaging application and/or a user token associated with a user (e.g., a sender and/or recipient of an electronic message from which the product was identified).

The product data 118 may be transmitted from the service provider server(s) 116 via the one or more networks 114 to the client-side component of the electronic messaging application. The product data 118 may be received via the API 112. The product data 118 may be embodied in a product card 120 that may be surfaced in any of a variety of ways to a sender or recipient of the electronic message from which the product was identified. The product card 120 may also be surfaced to other users as well such as other participants in the electronic messaging conversation 104 if, for example, the product was identified based on natural language processing of a combination of electronic messages from multiple participants in the electronic messaging application 104.

In certain example embodiments, a sender may send an electronic message that includes the product card 120 to one or more recipients. The product card 120 is illustratively shown in FIG. 1A as being sent from sender "John Doe" to other participants in the electronic messaging conversation 104. However, in other example embodiments, the product card 120 may be automatically included in the message stream of the electronic messaging conversation 104. As will be described in more detail later in this disclosure, a recipient may interact with the product card 120 to cause an application executing the recipient's device to be directed to a representation of a network resource identified by a URI contained in the product data 118 embodied by the product card 120. In addition, a recipient of the product card 120 may re-transmit the electronic message that includes the product card 120 to any number of additional recipients.

Figure 1B:
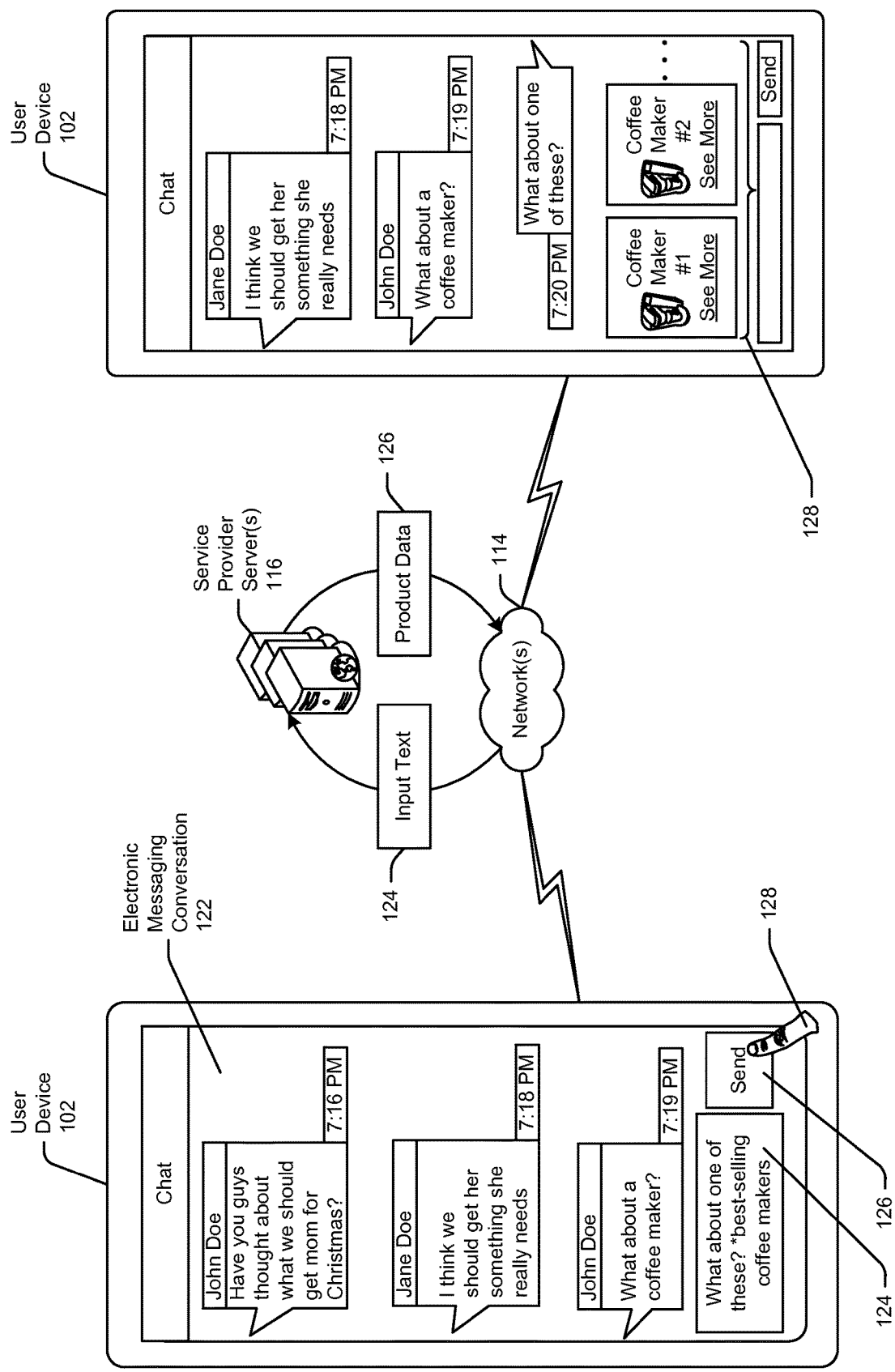
FIG. 1B is a schematic diagram illustrating i) the identification of electronic message text that is indicative of a request for product data corresponding to one or more products that satisfy one or more product filtering criteria; ii) the determination of one or more candidate products that satisfy the product filtering criteria; and iii) the presentation of the product data for the candidate product(s) in an electronic message sent to one or more recipients in accordance with one or more example embodiments of the disclosure.

FIG. 1B is a schematic diagram illustrating i) the identification of electronic message text that is indicative of a request for product data corresponding to one or more products that satisfy one or more product filtering criteria; ii) the determination of one or more candidate products that satisfy the product filtering criteria; and iii) the presentation of the product data for the candidate product(s) in an electronic message sent to one or more recipients in accordance with one or more example embodiments of the disclosure.

Another example electronic messaging conversation 122 is shown as being displayed on the user device 102. Any number of participants may be included in the electronic messaging conversation 122, with each participant transmitting zero or more electronic messages to the other participants in the conversation. A participant in the electronic messaging conversation 122 may enter electronic message text 124 into a character entry field of an electronic messaging application. The participant may select 128 a widget 126 to cause the electronic message text 124 to be transmitted as input text 124 to the service provider server(s) 116 for processing prior to transmission of any portion of the text 124 to one or more other participants in the conversation 122.

The service provider server(s) 116 may process the electronic message text 124 to determine that the text 124 includes a predetermined indicator of a specific request for data relating to one or more products. The indicator may be any suitable character, symbol, or the like. For example, the service provider server(s) 116 may perform natural language processing on a portion of the text 124 appearing after the indicator in order to determine one or more candidate products corresponding to the portion of the text 124. Although not depicted in FIG. 1B, in certain example embodiments, multiple indicators may be provided that identify electronic message text contained within the indicators as text to be processed to identify one or more candidate products. The natural language processing may further reveal one or more filtering criteria specified in the portion of the text 124 appearing after the indicator. The filtering criteria may be used to identify candidate products that satisfy the filtering criteria. For example, as shown in FIG. 1B, the electronic message text 124 may include the indicator '*' followed by the text "best-selling coffee makers." The electronic message text 124 may be processed to detect the indicator '*' and to determine a product type referenced in the portion of the text 124 following the indicator. The processing may further identify filtering criteria (e.g., "best-selling") to be applied in determining a set of candidate products that correspond to the product type and that satisfy the filtering criteria. It should be appreciated that any of a variety of types of filtering criteria may be specified. As another example, the filtering criteria specified in the portion of the text 124 following the indicator (or a portion of the text 124 contained within multiple indicators) may include "lowest priced," "best reviewed," or the like. In certain example embodiments, contextual data may be used to further narrow the set of candidate products. For example, geo-location data, time of day data, time of year data, etc. may be used to further filter the set of candidate products.

Upon identifying the set of candidate products, the service provider server(s) 116 may transmit representation of the product data 126 corresponding to the set of candidate products (e.g., one or more product cards 128) to one or more user devices to enable sharing of the product data 126. As shown in FIG. 1B, the product cards 128 may be automatically inserted into the electronic messaging conversation 122. For example, the portion of the text 124 following the indicator (or contained within multiple indicators) may be replaced with the product cards 128 in an electronic message corresponding to the text 124. In other example embodiments, the product cards 128 may be surfaced to a participant in the conversation 122 (e.g., a sender of the electronic message text 124), and the participant may send an electronic message that includes one or more of the product cards 128 to other participants in the conversation 124. In certain other example embodiments, the product data 126 may be presented as audible output from a speaker of a user device or from a speaker of a separate VA device.

Figure 1C:
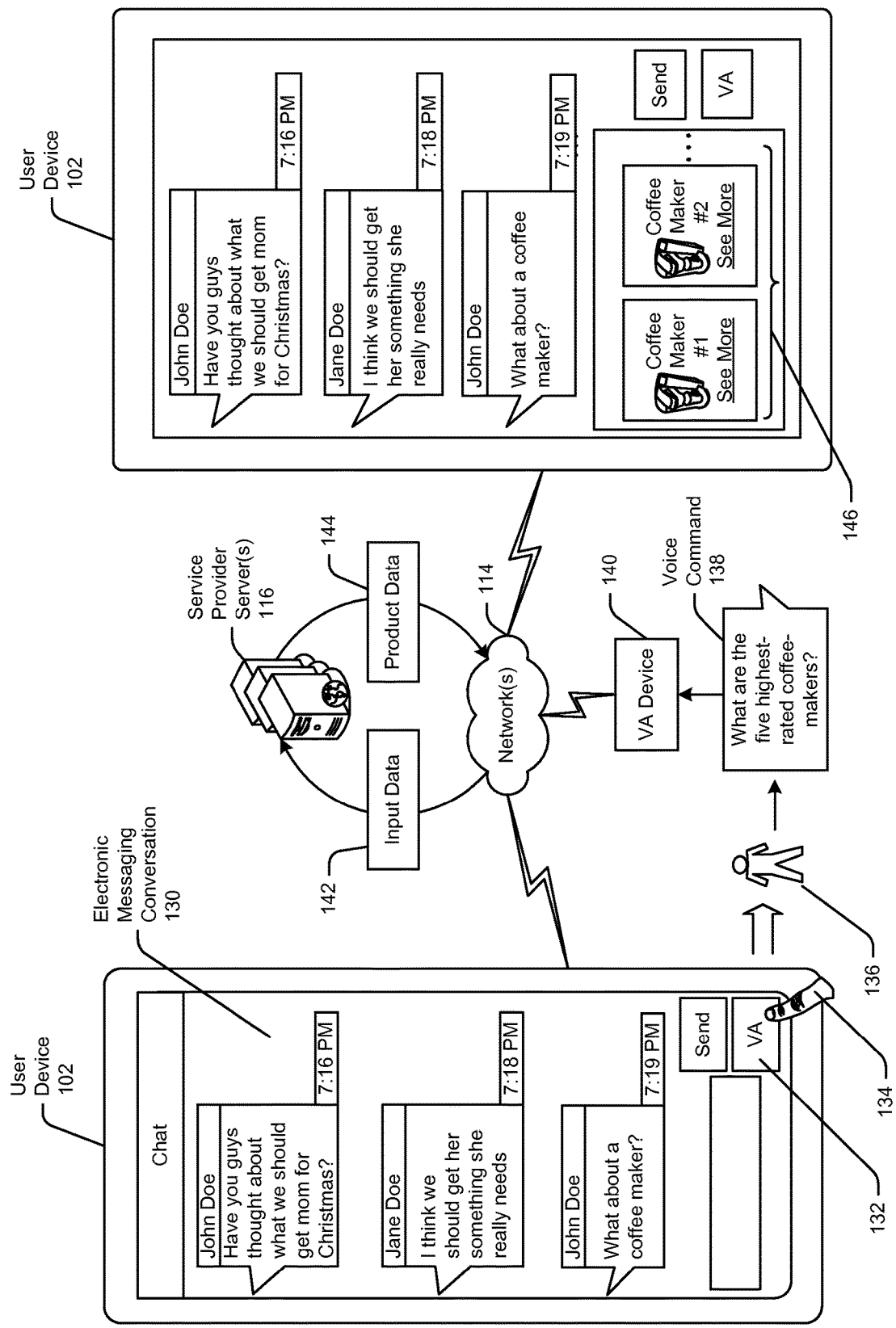
FIG. 1C is a schematic diagram illustrating i) the receipt and processing of voice input data to determine that the voice input data is indicative of a request for product data corresponding to one or more products that satisfy one or more product filtering criteria; ii) the determination of one or more candidate products that satisfy the product filtering criteria; and iii) the presentation of the product data for the candidate product(s) to an electronic messaging conversation participant to enable generation and transmission of an electronic message that includes the product data to one or more recipients in accordance with one or more example embodiments of the disclosure.

FIG. 1C is a schematic diagram illustrating i) the receipt and processing of voice input data to determine that the voice input data is indicative of a request for product data corresponding to one or more products that satisfy one or more product filtering criteria; ii) the determination of one or more candidate products that satisfy the product filtering criteria; and iii) the presentation of the product data for the candidate product(s) to an electronic messaging conversation participant to enable generation and transmission of an electronic message that includes the product data to one or more recipients in accordance with one or more example embodiments of the disclosure.

Another example electronic messaging conversation 130 is shown as being displayed on the user device 102. The electronic messaging application may include a widget 132 that responsive to selection 134 may initiate a listening mode for a VA device 140. A user 136 (e.g., a participant in the conversation 130) may provide a voice command 138 via, for example, a microphone of the user device 102 or a microphone of the VA device 140. The voice command 138 may be received by the VA device 140 and sent as input data 142 to the service provider server(s) 116. The service provider server(s) 116 may perform natural language processing on the voice input data 142 received from the VA device 140 to determine one or more candidate products or services relevant to a semantic context of the voice input. For example, based on the natural language processing, the service provider server(s) 116 may determine that the voice input data 142 corresponds to a request for one or more products. The service provider server(s) 116 may further determine that the voice input data 142 specifies one or more filtering criteria to be applied in determining the candidate product(s). In the example depicted in FIG. 1C, the filtering criteria specifies that the "five highest-rated" coffee makers should be identified. Accordingly, the service provider server(s) 116 may apply the filtering criteria so as to obtain product data 144 for those coffee makers that constitute the "five highest-rated" coffee makers. Customer ratings across an aggregate number of users may be used to identify the "five highest-rated" coffee makers. It should be appreciated that in certain example embodiments, at least a portion of the functionality described as being performed by the service provider server(s) 116 may be performed by the VA device 140.

In certain example embodiments, contextual data may be used to further narrow the set of candidate products. For example, geo-location data, time of day data, time of year data, etc. may be used to further filter the set of candidate products to those that are relevant to a current context for the user 136 or one or more other participants in the conversation 130. For example, the set of five highest-rated coffee makers may be determined from coffee makers having a threshold number of sales, a threshold number of customer reviews, etc. within a geographic region that encompasses a current location of the user 136 or a current location of one or more other participants in the conversation 130.

In certain other example embodiments, rather than performing natural language processing on the input data 142, the service provider server(s) 116 and/or the VA device 140 may perform speech recognition processing on the voice input data 142 to generate a character string representative of the voice command 138. The service provider server(s) 116 and/or the VA device 140 may then execute a search query for the character string to generate a set of search results corresponding to the search query. The product data 144 may include an indication of the search results. For example, the product data 144 may include one or more product cards displaying the search results. Alternatively, a set of candidate products determined to have the highest relevancy to the search query may be identified and product data 144 relating thereto may be sent to one or more user devices (e.g., the user device 102).

As depicted in FIG. 1C, the product data 144 (which may be embodied in the form of one or more product cards 146) may be presented within a field for character entry in the electronic messaging application. The user 136 may then have the ability to send the cards 146, potentially along with additional text, to one or more other participants in the conversation 130 and/or to one or more other recipients. The user 136 may further have the ability to delete one or more of the cards 146. Alternatively, the cards 146 may be automatically inserted into the message stream of the conversation 130. As previously described, recipients of the cards 146 may share the cards 146 with one or more other users. As described in connection with other example embodiments, it should be appreciated that the product data 144 may be provided in the form of audible output from a speaker of the VA device 140 and/or from a speaker of the user device 102 or user devices associated with other participants in the conversation 130.

While example embodiments have been described in connection with product data being provided in the form of product cards that are sharable within a message stream of an electronic messaging conversation, it should be appreciated that the product data may be disseminated in a number of other ways. For example, the product data may be provided in an e-mail message, a downloadable file, or the like. Further, while a product card has been described as including various product data describing characteristics of the product as well as a selectable link that directs to a representation (e.g., a landing page or the like) of a network resource for obtaining additional information regarding the product, it should be appreciated that the product card may have any suitable format and may include any suitable product-related information. For example, rather than including a particular selectable link, any portion of the product card may be selectable. In addition, as previously noted, while example embodiments may be described herein in connection with identifying candidate products relevant to a semantic context of an electronic messaging conversation or a voice command, it should be appreciated that the disclosure encompasses the identification of any candidate entity (e.g., a service, a user profile such as a social networking profile, consumable content such as a movie, a physical location to visit or an event to attend, etc.) that may be relevant to the semantic context of an electronic message, a voice-based conversation or command, or the like.

Illustrative Architecture

Figure 2:
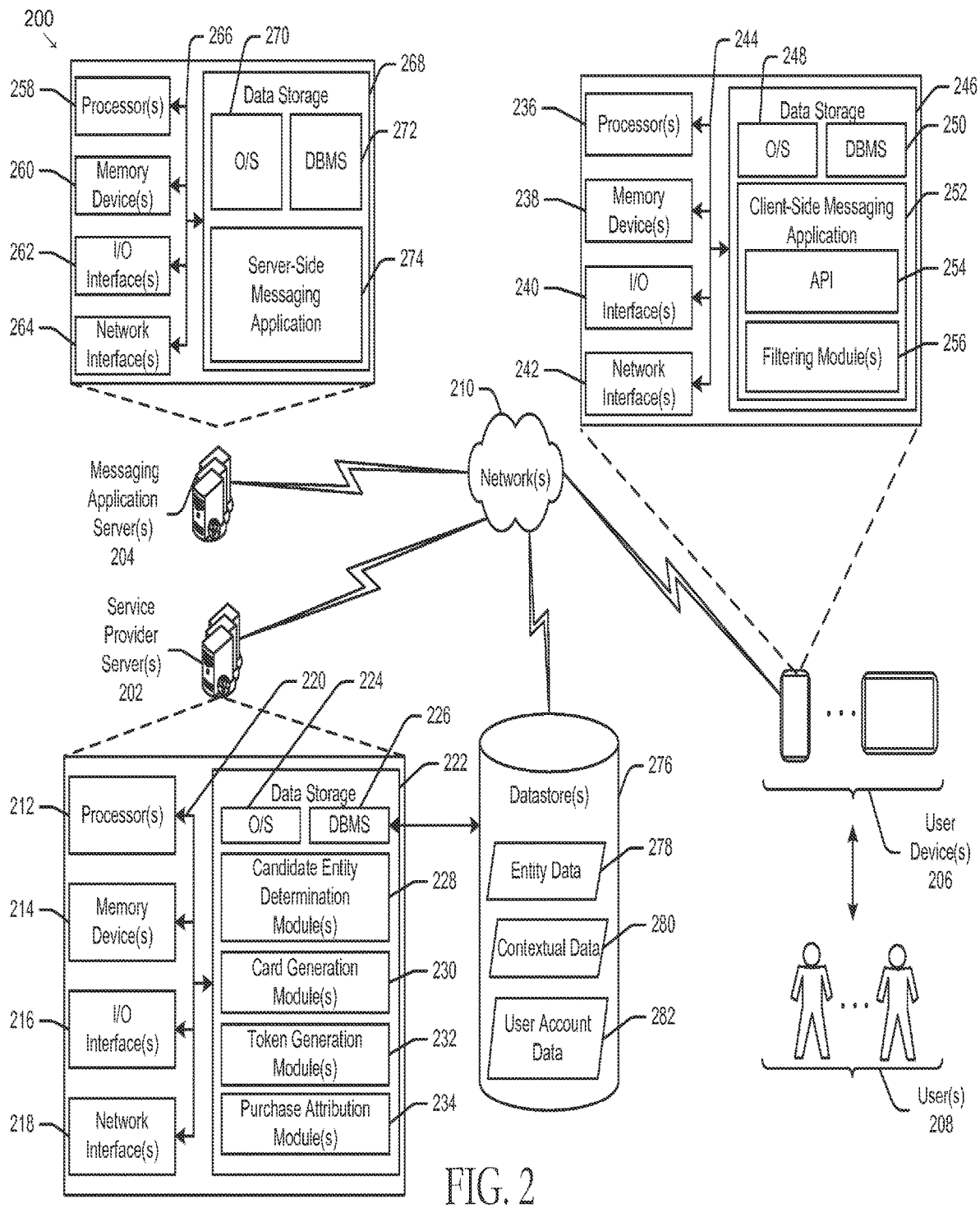
FIG. 2 is a schematic block diagram of an illustrative networked architecture in accordance with one or more example embodiments of the disclosure.

FIG. 2 is a schematic block diagram of an illustrative networked architecture in accordance with one or more example embodiments of the disclosure. The networked architecture 200 may include one or more service provider servers 202, one or more messaging application servers 204, and one or more user devices 206 operable by one or more users 208. The user device(s) 206 may include any of the user device(s) depicted or described throughout this disclosure. Similarly, the user(s) 208 may include any of the user(s) depicted or described throughout this disclosure. While the service provider server(s) 202, the messaging application server(s) 204, and/or the user device(s) 206 may be referred to herein in the singular, it should be appreciated that multiple ones of any of the illustrative components of the networked architecture 200 may be provided, and any processing described as being performed by a particular component of the architecture 200 may be performed in a distributed manner by multiple such components.

The service provider server 202, the messaging application server 204, and/or the user device 206 may be configured to communicate via one or more networks 210 which may include one or more of the network(s) 114. The network(s) 210 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 210 may have any suitable communication range associated therewith and may include, for example, global networks (e.g., the Internet), metropolitan area networks (MANs), wide area networks (WANs), local area networks (LANs), or personal area networks (PANs). In addition, the network(s) 210 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the service provider server 202 may include one or more processors (processor(s)) 212, one or more memory devices 214 (generically referred to herein as memory 214), one or more input/output ("I/O") interface(s) 216, one or more network interfaces 218, and data storage 222. The service provider server 202 may further include one or more buses 220 that functionally couple various components of the server 202. These various components of the server 202 will be described in more detail hereinafter.

The bus(es) 220 may include at least one of a system bus, a memory bus, an address bus, or a message bus, and may permit exchange of information (e.g., data (including computer-executable code), signaling, etc.) between various components of the server 202. The bus(es) 220 may include, without limitation, a memory bus or a memory controller, a peripheral bus, an accelerated graphics port, and so forth. The bus(es) 220 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 214 of the server 202 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 214 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 214 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 222 may include removable storage and/or non-removable storage including, but not limited to, magnetic storage, optical disk storage, and/or tape storage. The data storage 222 may provide non-volatile storage of computer-executable instructions and other data. The memory 214 and the data storage 222, removable and/or non-removable, are examples of computer-readable storage media (CRSM) as that term is used herein.

The data storage 222 may store computer-executable code, instructions, or the like that may be loadable into the memory 214 and executable by the processor(s) 212 to cause the processor(s) 212 to perform or initiate various operations. The data storage 222 may additionally store data that may be copied to memory 214 for use by the processor(s) 212 during the execution of the computer-executable instructions. Moreover, output data generated as a result of execution of the computer-executable instructions by the processor(s) 212 may be stored initially in memory 214, and may ultimately be copied to data storage 220 for non-volatile storage.

More specifically, the data storage 222 may store one or more operating systems (O/S) 224; one or more database management systems (DBMS) 226; and one or more program modules, applications, or the like such as, for example, one or more candidate entity determination modules 228, one or more card generation modules 230, one or more token generation modules 232, and one or more purchase attribution modules 234. Any of the program modules may include one or more sub-modules. In addition, the data storage 222 may store various other types of data such as, for example, any of the data depicted as being stored in the datastore(s) 276. Any of the modules depicted in FIG. 2 may include computer-executable code, instructions, or the like that may be loaded into the memory 214 for execution by one or more of the processor(s) 212. Further, any data stored in the data storage 222 may be loaded into the memory 214 for use by the processor(s) 212 in executing computer-executable code. In addition, any data stored in the datastore(s) 276 may be accessed via the DBMS 226 and loaded in the memory 214 for use by the processor(s) 212 in executing computer-executable code.

The datastores(s) 276 may include, without limitation, databases (e.g., relational, object-oriented, etc.), file systems, flat files, distributed datastores in which data is stored on more than one node of a computer network, peer-to-peer network datastores, or the like. The datastore(s) 276 may store various types of data, such as, for example, entity data 278, contextual data 280, and user account data 282. The entity data 278 may include data pertaining to one or more entities such as, for example, one or more candidate products, services, user profiles, physical locations, or the like that may be relevant to a semantic context of electronic message text or voice data. Such data may include a description of one or more characteristics or attributes of the candidate entity. For example, in the context of a candidate product, the entity data 278 may include a product description, product specifications, a product image, or the like. The contextual data 280 may include any data that may be used to filter a set of one or more candidate entities determined to be relevant to a semantic context of electronic message text or voice data such as, for example, geo-location data, time of day data, time of year data, or the like. The user account data 282 may include any information associated with a user profile or account maintained at the service provider server 202 and/or the messaging application server 204.

The processor(s) 212 may be configured to access the memory 214 and execute computer-executable instructions loaded therein. For example, the processor(s) 212 may be configured to execute computer-executable instructions of the various program modules of the server 202 to cause or facilitate various operations to be performed in accordance with one or more embodiments of the disclosure. The processor(s) 212 may include any suitable processing unit capable of accepting data as input, processing the input data in accordance with stored computer-executable instructions, and generating output data. The processor(s) 212 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 212 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 212 may be capable of supporting any of a variety of instruction sets.

Referring now to functionality supported by the various program modules depicted in FIG. 2, the candidate entity determination module(s) 228 may include computer-executable instructions, code, or the like that are responsive to execution by one or more of the processor(s) 212 may cause operations to be performed for applying one or more natural language processing or speech recognition algorithms to input data (e.g., electronic message text, voice data, etc.) to determine one or more candidate entities (e.g., products, services, user profiles, etc.) that are relevant to a semantic context of the input data. In an example embodiment, the candidate entity determination module(s) 228 may include computer-executable instructions for performing natural language processing of one or more electronic messages to determine a product or set of candidate products referenced in or otherwise relevant to a semantic context of the electronic message(s).

The card generation module(s) 230 may include computer-executable instructions, code, or the like that are responsive to execution by one or more of the processor(s) 212 may cause operations to be performed for generating and/or retrieving entity data 278 for one or more candidate entities determined by the execution of the candidate entity determination module(s) 228 and embodying the entity data 278 in a package of information (e.g., a card) that may be shared via electronic means such as, for example, as part of an electronic message. A card generated by the card generation module(s) 230 may be automatically inserted into an electronic message stream that includes electronic messages having a semantic context to which the card is relevant or may be surfaced on a user device of a user (e.g., a sender or recipient of such an electronic message), thereby permitting the user to send the card to one or more other recipients. A card may include or otherwise be associated with entity data 278 for the entity (e.g., product, service, etc.) to which the card corresponds. In the context of a product card, the product data 278 may include descriptive information about the product as well as a network resource identifier (which may be targeted by a selectable link or other widget presented as part of the card) that identifies a network resource and enables interaction with a representation (e.g., a product detail page) of the network resource.

The token generation module(s) 232 may include computer-executable instructions, code, or the like that are responsive to execution by one or more of the processor(s) 212 may cause operations to be performed for generating a token associated with a known user such as, for example, as part of an authentication of a user or generating a token associated with an unknown user that may be provided in a URI as well as subsequently provided if a card recipient completes a purchase using the URI.

The purchase attribution module(s) 228 may include computer-executable instructions, code, or the like that are responsive to execution by one or more of the processor(s) 212 may cause operations to be performed for attributing a purchase of an entity (e.g., a product, service, etc.) to a messaging application using a reference tag included in a URI and/or attributing a purchase to a sender or recipient of a card based on a corresponding user token included in the URI.

Processing supported by each of these program module(s) will be described in more detail later in this disclosure with reference to the illustrative data flows depicted in FIG. 3 and the illustrative methods depicted in FIGS. 4-6.

Referring now to other illustrative components depicted as being stored in the data storage 222, the O/S 224 may be loaded from the data storage 222 into the memory 214 and may provide an interface between other application software executing on the server 202 and hardware resources of the server 202. More specifically, the O/S 224 may include a set of computer-executable instructions for managing hardware resources of the server 202 and for providing common services to other application programs (e.g., managing memory allocation among various application programs). The O/S 224 may include any operating system now known or which may be developed in the future including, but not limited to, any server operating system, any mainframe operating system, or any other proprietary or non-proprietary operating system.

The DBMS 226 may be loaded into the memory 214 and may support functionality for accessing, retrieving, storing, and/or manipulating data stored in the memory 214, data stored in the data storage 222, and/or data stored in the datastore(s) 276. The DBMS 226 may use any of a variety of database models (e.g., relational model, object model, etc.) and may support any of a variety of query languages. The DBMS 226 may access data represented in one or more data schemas and stored in any suitable data repository such as any of the datastore(s) 276.

Referring now to other illustrative components of the server 202, one or more input/output (I/O) interfaces 216 may be provided that may facilitate the receipt of input information by the server 202 from one or more I/O devices as well as the output of information from the server 202 to the one or more I/O devices. The I/O devices may include, for example, one or more user interface devices that facilitate interaction between a user and the server 202 including, but not limited to, a display, a keypad, a pointing device, a stylus, a control panel, a touch screen display, a gesture capture device, a remote control device, a microphone, a speaker, and so forth. The I/O devices may further include, for example, any number of peripheral devices such as data storage devices, printing devices, and so forth.

The server 202 may further include one or more network interfaces 218 via which the server 202 may communicate with any of a variety of other systems, platforms, networks, devices, and so forth. Such communication may occur via any of one or more of the network(s) 210.

In an illustrative configuration, the messaging application server 204 may include one or more processors (processor(s)) 258, one or more memory devices 260 (generically referred to herein as memory 260), one or more input/output ("I/O") interface(s) 262, one or more network interfaces 264, and data storage 268. The messaging application server 204 may further include one or more buses 222 that functionally couple various components of the server 202. These various components of the server 202 will be described in more detail hereinafter.

The bus(es) 220 may include any of the types of buses described with respect to the buses 220. The memory 260 of the server 204 may include any of the types of memory described with respect to the memory 214. The data storage 268 may include any of the types of data storage described with respect to the data storage 222.

The data storage 268 may store computer-executable code, instructions, or the like that may be loadable into the memory 260 and executable by the processor(s) 258 to cause the processor(s) 258 to perform or initiate various operations. The data storage 268 may additionally store data that may be copied to memory 260 for use by the processor(s) 258 during the execution of the computer-executable instructions. Moreover, output data generated as a result of execution of the computer-executable instructions by the processor(s) 258 may be stored initially in memory 260, and may ultimately be copied to data storage 268 for non-volatile storage.

More specifically, the data storage 268 may store one or more operating systems (O/S) 270; one or more database management systems (DBMS) 272; and one or more program modules, applications, or the like such as, for example, a server-side component of a messaging application. Any of the program modules may include one or more sub-modules. In addition, although not shown in FIG. 2, the data storage 268 may include one or more modules configured to perform any of the functionality of any of the program modules of the service provider server 202. Moreover, the data storage 268 may store various other types of data such as, for example, any of the data depicted as being stored in the datastore(s) 276. Any of the modules depicted in FIG. 2 may include computer-executable code, instructions, or the like that may be loaded into the memory 260 for execution by one or more of the processor(s) 258. Further, any data stored in the data storage 268 may be loaded into the memory 260 for use by the processor(s) 258 in executing computer-executable code. In addition, any data stored in the datastore(s) 276 may be accessed via the DBMS 272 and loaded in the memory 260 for use by the processor(s) 258 in executing computer-executable code.

The processor(s) 258 may be configured to access the memory 260 and execute computer-executable instructions loaded therein. For example, the processor(s) 258 may be configured to execute computer-executable instructions of the various program modules of the server 204 to cause or facilitate various operations to be performed in accordance with one or more embodiments of the disclosure. The processor(s) 258 may include any of the types of processors described with respect to the processor(s) 212.

Referring now to other illustrative components depicted as being stored in the data storage 268, the O/S 270 may be loaded from the data storage 268 into the memory 260 and may provide an interface between other application software executing on the server 204 and hardware resources of the server 204. More specifically, the O/S 270 may include a set of computer-executable instructions for managing hardware resources of the server 204 and for providing common services to other application programs (e.g., managing memory allocation among various application programs). The O/S 270 may include any operating system now known or which may be developed in the future including, but not limited to, any server operating system, any mainframe operating system, or any other proprietary or non-proprietary operating system.

The DBMS 272 may be loaded into the memory 260 and may support functionality for accessing, retrieving, storing, and/or manipulating data stored in the memory 260, data stored in the data storage 268, and/or data stored in the datastore(s) 276. The DBMS 272 may use any of a variety of database models (e.g., relational model, object model, etc.) and may support any of a variety of query languages. The DBMS 272 may access data represented in one or more data schemas and stored in any suitable data repository such as any of the datastore(s) 276.

Referring now to other illustrative components of the server 204, one or more input/output (I/O) interfaces 262 may be provided that may facilitate the receipt of input information by the server 204 from one or more I/O devices as well as the output of information from the server 204 to the one or more I/O devices. The I/O devices may include, for example, any of the I/O devices described in connection with the I/O interface(s) 216 of the service provider server 202.

The server 204 may further include one or more network interfaces 264 via which the server 204 may communicate with any of a variety of other systems, platforms, networks, devices, and so forth. Such communication may occur via any of one or more of the network(s) 210.

The user device(s) 208 may include any suitable computing device including, but not limited to, a mobile device such as a smartphone, tablet, e-reader, wearable device, or the like; a desktop computer; or a laptop computer. In an illustrative configuration, the user device 206 may include one or more processors (processor(s)) 236, one or more memory devices 238 (generically referred to herein as memory 238), one or more input/output ("I/O") interface(s) 240, one or more network interfaces 242, and data storage 246. The user device 206 may further include one or more buses 244 that functionally couple various components of the user device 206. These various components of the user device 206 will be described in more detail hereinafter.

The bus(es) 244 may include any of the types of buses described with respect to the buses 220, the memory 238 of the user device 206 may include any of the types of memory described with respect to the memory 214, and the data storage 246 may include any of the types of data storage described with respect to the data storage 222.

The data storage 246 may store computer-executable code, instructions, or the like that may be loadable into the memory 238 and executable by the processor(s) 236 to cause the processor(s) 236 to perform or initiate various operations. The data storage 246 may additionally store data that may be copied to memory 238 for use by the processor(s) 236 during the execution of the computer-executable instructions. Moreover, output data generated as a result of execution of the computer-executable instructions by the processor(s) 236 may be stored initially in memory 238, and may ultimately be copied to data storage 246 for non-volatile storage.

More specifically, the data storage 246 may store one or more operating systems (O/S) 248; one or more database management systems (DBMS) 250; and one or more program modules, applications, or the like such as, for example, a client-side component 252 of a messaging application which may include, or otherwise be associated with, an API 254 and one or more filtering modules 256. The client-side component 252 of the messaging application may utilize the API 254 to communicate with the service provider server 202, for example. The filtering module(s) 256 may include computer-executable code or the like that is responsive to execution by one or more of the processor(s) 236 may cause operations to be performed for filtering electronic message text in accordance with one or more filtering criteria in order to identify text having a higher likelihood of having a semantic context relevant to one or more candidate entities. Any of the program modules may include one or more sub-modules. In addition, although not shown in FIG. 2, the data storage 246 may include one or more modules configured to perform any of the functionality of any of the program modules of the service provider server 202. Moreover, the data storage 246 may store various other types of data such as, for example, any of the data depicted as being stored in the datastore(s) 276. Any of the modules depicted in FIG. 2 may include computer-executable code, instructions, or the like that may be loaded into the memory 238 for execution by one or more of the processor(s) 240. Further, any data stored in the data storage 246 may be loaded into the memory 238 for use by the processor(s) 236 in executing computer-executable code. In addition, any data stored in the datastore(s) 276 may be accessed via the DBMS 250 and loaded in the memory 238 for use by the processor(s) 236 in executing computer-executable code.

The processor(s) 236 may be configured to access the memory 238 and execute computer-executable instructions loaded therein. For example, the processor(s) 236 may be configured to execute computer-executable instructions of the various program modules of the user device 206 to cause or facilitate various operations to be performed in accordance with one or more embodiments of the disclosure. The processor(s) 236 may include any of the types of processors described with respect to the processor(s) 212.

Referring now to other illustrative components depicted as being stored in the data storage 246, the O/S 248 may be loaded from the data storage 246 into the memory 238 and may provide an interface between other application software executing on the user device 206 and hardware resources of the user device 206. More specifically, the O/S 248 may include a set of computer-executable instructions for managing hardware resources of the user device 206 and for providing common services to other application programs (e.g., managing memory allocation among various application programs). The O/S 248 may include any suitable user device operating system.

The DBMS 250 may be loaded into the memory 238 and may support functionality for accessing, retrieving, storing, and/or manipulating data stored in the memory 238 and/or data stored in the data storage 246. The DBMS 250 may use any of a variety of database models (e.g., relational model, object model, etc.) and may support any of a variety of query languages. The DBMS 250 may access data represented in one or more data schemas and stored in any suitable data repository such as any of the datastore(s) 276.

Referring now to other illustrative components of the user device 206, one or more input/output (I/O) interfaces 240 may be provided that may facilitate the receipt of input information by the user device 206 from one or more I/O devices as well as the output of information from the user device 206 to the one or more I/O devices. The I/O devices may include, for example, any of the I/O devices described with respect to the service provider server 202.

The user device 206 may further include one or more network interfaces 242 via which the user device 206 may communicate with any of a variety of other systems, platforms, networks, devices, and so forth. Such communication may occur via any of one or more of the network(s) 210.

It should be appreciated that the program modules, applications, computer-executable instructions, code, or the like depicted in FIG. 2 as being stored in the data storage 222, the data storage 246, and/or the data storage 268 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 202, the server 204, the user device 206, and/or hosted on other computing device(s) accessible via one or more of the network(s) 210, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the server 202, the server 204, and/or the user device 206 may include alternate and/or additional hardware, software, or firmware components beyond those described or depicted without departing from the scope of the disclosure. More particularly, it should be appreciated that software, firmware, or hardware components depicted as forming part of the server 202, the server 204, and/or the user device 206 are merely illustrative and that some components may not be present or additional components may be provided in various embodiments. While various illustrative program modules have been depicted and described as software modules stored in data storage 222, data storage 246, and/or data storage 268, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 4:
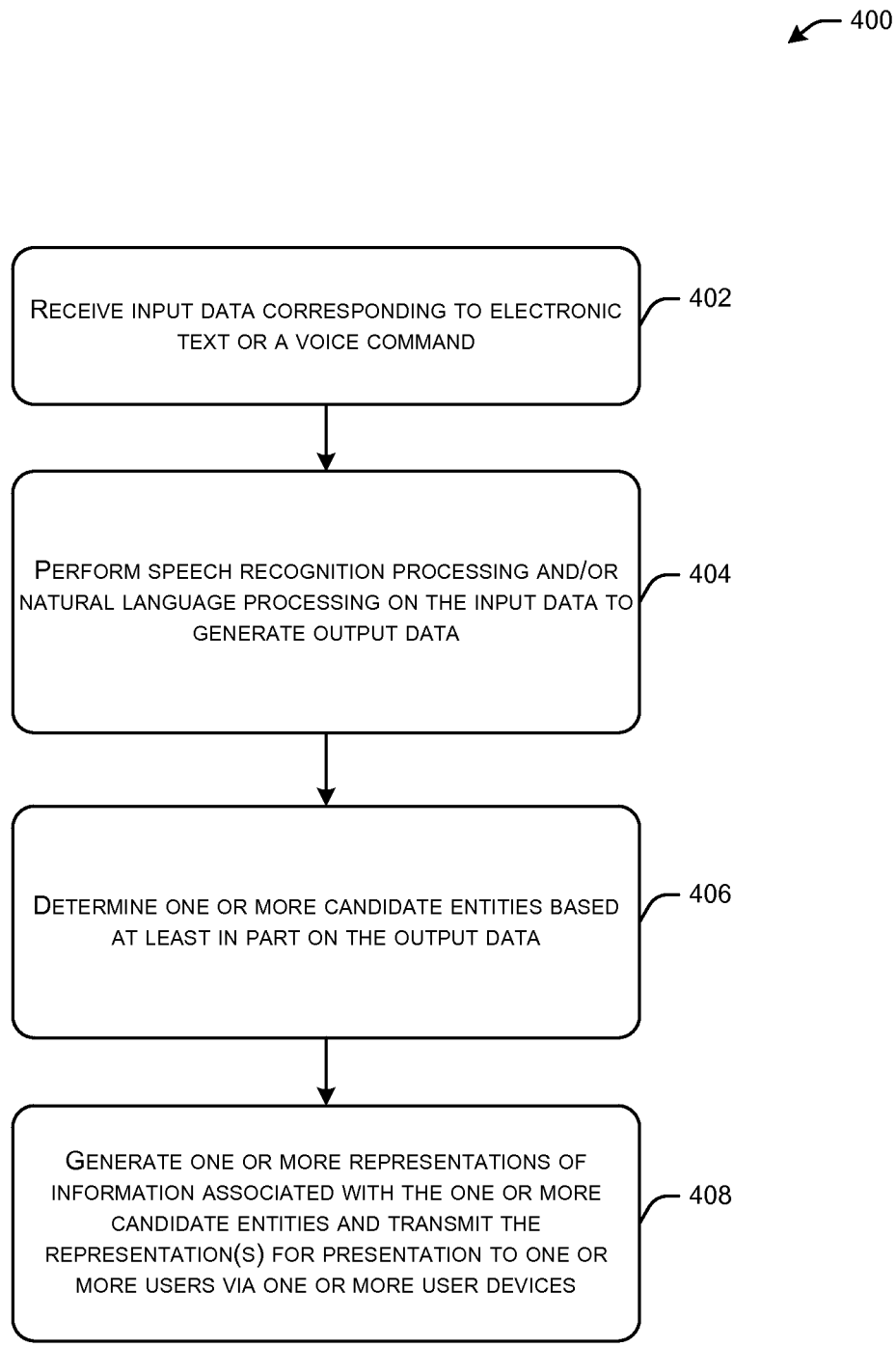
FIG. 4 is a process flow diagram of an illustrative method for receiving input data, processing the input data to generate output data, determining one or more candidate entities based on the output data, and generating and transmitting one or more representations of information associated with the one or more candidate entities for presentation to one or more users in accordance with one or more example embodiments of the disclosure.

FIG. 4 is a process flow diagram of an illustrative method 400 for receiving input data, processing the input data to generate output data, determining one or more candidate entities based on the output data, and transmitting information associated with the one or more candidate entities for presentation to one or more users in accordance with one or more example embodiments of the disclosure.

At block 402, the service provider server 202 may receive input data corresponding to electronic text or a voice command. The electronic text may be text contained in one or more electronic messages or may be text that has been entered into a character entry field but not yet transmitted to one or more message recipients. The electronic text may be received from a client-side component 252 of a messaging application on a user device 206, potentially via a server-side component 274 of the messaging application. The voice command may be captured by a microphone of the user device 206 or by a microphone of a VA device 140 and communicated to the service provider server 202.

At block 404, computer-executable instructions of the candidate entity determination module(s) 228 may be executed to perform natural language processing on the electronic text or voice data to generate output data indicative of a semantic context of the electronic text or voice data. In those example embodiments in which the input data contains electronic text, the candidate entity determination module(s) 228 may search for and locate one or more indicators in the text and identify a semantic context of text following an indicator or contained within multiple indicators. In other example embodiments, computer-executable instructions of the candidate entity determination module(s) 228 may be executed to perform speech recognition processing on voice data to generate output data containing a character string representative of the voice data.

At block 406, computer-executable instructions of the candidate entity determination module(s) 228 may be executed to determine one or more candidate entities (e.g., products, services, user profiles, etc.) pertaining to a semantic context of the electronic text or voice data, where the semantic context may be reflected in the output data generated at block 404. In certain example embodiments, filtering criteria (which may be specified in the input data) and/or contextual data may be used to filter a larger set of candidate entities potentially relevant to the semantic context of the input data to a smaller set of candidate entities that satisfy the filtering criteria and/or contextual data.

At block 408, computer-executable instructions of card generation module(s) 230 may be executed to generate one or more representations of information associated with the one or more candidate entities. For example, in those example embodiments in which the candidate entities are products, one or more product cards may be generated. The product cards may include or embody product data such as information identifying one or more attributes of the product as well as a network resource identifier that identifies a network resource and specifies a network location of the network resource and an access mechanism for accessing a representation (e.g., a product detail page) of the network resource. The generated card(s) may be transmitted to one or more user devices to enable sharing of the card(s) via electronic messaging applications. In addition, in certain example embodiments, the information associated with the one or more representations may be presented via auditory output from a speaker of a user device or a speaker of a VA device 140.

Figure 3:
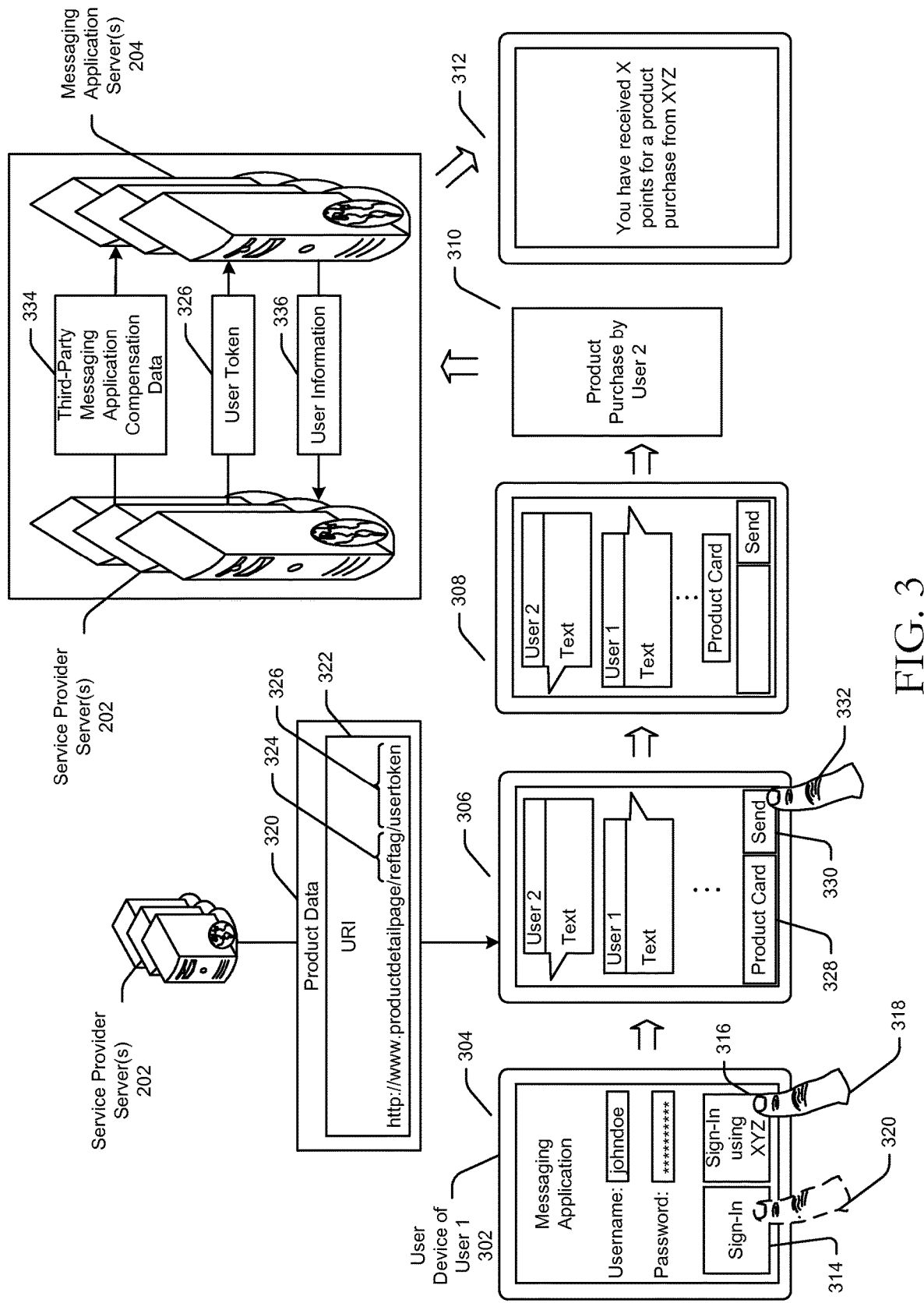
FIG. 3 is an illustrative data flow diagram illustrating mechanisms for attributing a product purchase to an electronic messaging application provider and/or a sender/recipient of an electronic message using a network resource identifier that includes a reference tag for the provider and a user token for the sender/recipient and mechanisms for compensating the provider and/or the sender/recipient for the product purchase in accordance with one or more example embodiments of the disclosure.

FIG. 3 is an illustrative data flow diagram illustrating mechanisms for attributing a product purchase to an electronic messaging application provider and a sender of an electronic message using a network resource identifier that includes a reference tag for the provider and a user token for the sender and mechanisms for compensating the provider and/or the sender for the product purchase in accordance with one or more example embodiments of the disclosure. FIG. 5 is a process flow diagram of an illustrative method 500 for filtering electronic message text to identify text to which natural language processing is to be applied to identify a product and receiving product data for the product that may be included in an electronic message from a sender to a recipient in accordance with one or more example embodiments of the disclosure. FIG. 6 is a process flow diagram of an illustrative method 600 for attributing a product purchase to an electronic messaging application provider and/or a sender of an electronic message and generating compensation data for compensating the provider and/or the sender in accordance with one or more example embodiments of the disclosure. FIGS. 3 and 5-6 will be described hereinafter in conjunction with each other. While example embodiments described in connection with FIGS. 3, 5, and 6 may be described in the context of a user token associated with a sender of an electronic message that enables compensating a sender for a product purchase by a recipient, it should be appreciated that a user token associated with a recipient of an electronic message may additionally or alternatively be provided so as to enable compensating the recipient. Further, while example embodiments described in connection with FIGS. 3, 5, and 6 may be described in connection with identification of one or more candidate products and purchase of a product, it should be appreciated that such example embodiments are applicable to the purchase of any suitable entity (e.g., a service, consumable content, etc.).

In a first stage 304 of the event flow depicted in FIG. 3, user 1 may utilize a user device 302 to access an electronic messaging application. The electronic messaging application may be associated with a third-party that is different from a service provider associated with the service provider server(s) 202. The user may be prompted by the electronic messaging application to enter his/her authentication credentials to access the application. The user may be provided with a selectable widget 314 to sign-in to the application using authentication credentials specific to the electronic messaging application. The user may also be provided with a selectable widget 316 to sign-in to the application using authentication credentials associated with the service provider (XYZ). If the user signs into the application using the authentication credentials associated with the service provider XYZ, the application may redirect the user to the service provider server(s) 202, which may authenticate the user based on the authentication credentials and provide a token back to the electronic messaging application that may then be stored in association with the user's account with the electronic messaging application provider. That token may then be provided by the electronic messaging application to the service provider server(s) 202 in connection with electronic messages originated by the user that are sent for natural language processing.

At a second stage 306 in the event flow, an electronic messaging conversation between user 1 and a second user (user 2) is depicted. Referring now to FIGS. 3 and 5 in conjunction with one another, at block 502, electronic message text from the electronic messaging conversation may be provided to a text filter. For example, the filter may receive text from electronic messages transmitted by user 1 and user 2 as part of the electronic messaging conversation.

At block 504, the client-side filter may execute one or more algorithms to determine that at least a portion of the received electronic message text satisfies one or more filtering criteria. The filtering criteria may include any of the criteria previously described. For example, the filter may determine that one or more electronic messages sent by user 1 and/or one or more electronic messages sent by user 2 satisfy the filtering criteria.

At block 506, the electronic messaging application may transmit the electronic message text satisfying the filtering criteria to the service provider server(s) 202 which may perform natural language processing of the text. In certain example embodiments, the messaging application may transmit a respective user token corresponding to each sender of each electronic message that is transmitted. The user token may be a token that was previously received by the electronic messaging application from the service provider server(s) 202 if, for example, the user was authenticated through the service provider. Alternatively, the user token may be a token generated by the messaging application. Further, in certain example embodiments, the messaging application may not transmit a user token with the electronic message text.

The service provider server(s) 202 may perform natural language processing on the received text to identify a product referenced in the text and/or a product that is contextually relevant to the text. For example, the service provider server(s) 202 may identify a specific product referenced in an electronic message sent by user 1. The service provider server(s) 202 may then generate and/or retrieve product data 320 and transmit one or more representations of the product data 320 to the electronic messaging application at block 508. The product data 320 may include metadata associated with the product as well as a URI 322 that identifies a network resource and enables access to a representation of the network resource (e.g., a landing page such as a product detail page for the product). The URI 322 may further include a reference tag 324 that is uniquely associated with the messaging application and a user token 326 associated with a sender (e.g., user 1) of the electronic message from which the product was identified. The user token 326 may be a token that was received from the messaging application in connection with the electronic message text. Such a token may be a token that the service provider server(s) 202 previously generated and provided to the messaging application upon authenticating the user in response to selection of widget 316 or may be a token that was independently generated by the messaging application. In other example embodiments in which the sender of the electronic message is not known to the service provider server(s) 202, the token 326 may be generated by the service provider server(s) 202 and provided to the messaging application, and a server-side component of the messaging application may associate the token with the sender's account with the messaging application provider.

At stage 306 in the event flow, the product data 320 may be embodied in a product card 328 that is surfaced to one or more users. For example, the product card 328 may be surfaced to a sender (e.g., user 1) of an electronic message from which the corresponding product was identified. In those example embodiments in which a product is identified based on natural language processing of a group of electronic messages and not necessarily from any specific message, a product card 328 may be surfaced for one or more senders of the group of electronic messages, with each product card 328 embodying product data 320 that includes a URI 322 that contains a user token for a corresponding sender.

At stage 306, a particular user (e.g., user 1) may select 332 a selectable widget 330 to cause, at block 508, an electronic message to be transmitted to a recipient (e.g., user 2) that includes the product card 328. Upon receipt of the electronic message containing the product card 328, at stage 308, the recipient (e.g., a user 2) may select a selectable widget included in the product card 328 (e.g., hyperlinked anchor text) that represents the URI 322 which may cause an application executing on the recipient's user device to be directed to a representation of the network resource (e.g., a landing page such as a product detail page) identified by the URI 322, as reflected in block 510.

Figure 6:
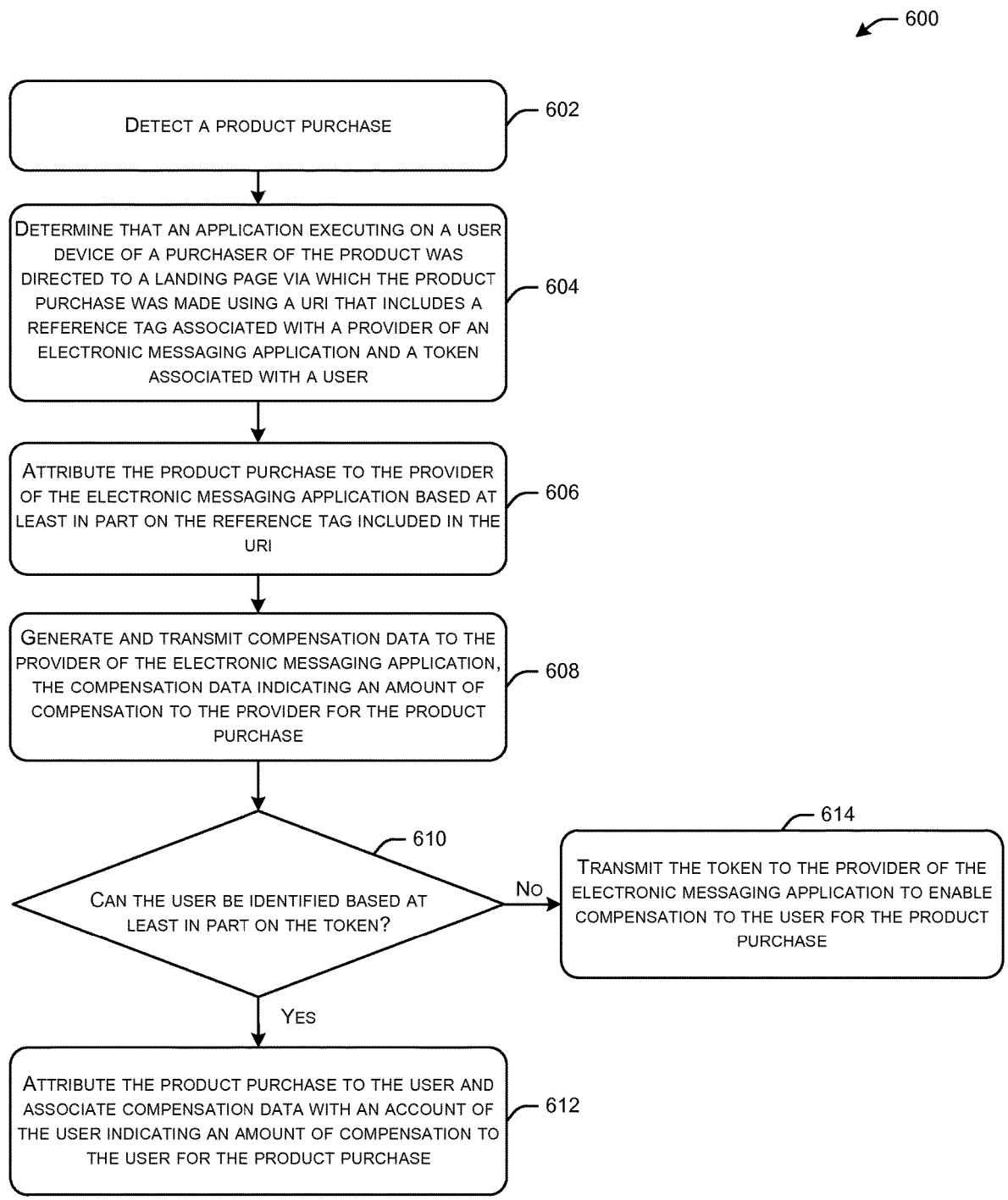
FIG. 6 is a process flow diagram of an illustrative method for attributing a product purchase to an electronic messaging application provider and/or a sender/recipient of an electronic message and generating compensation data for compensating the provider and/or the sender/recipient in accordance with one or more example embodiments of the disclosure.

Referring now to FIGS. 3 and 6 in conjunction with each other, upon being directed to the product detail page for the product, an application session may be established between the server provider server 202 hosting the product detail page and the application used to access the product detail page. The recipient then may initiate and complete a purchase of the product which may be detected at block 602.

At block 604, the service provider server 202 may determine that the application executing on the user device (e.g., browser application, mobile application, etc.) was directed to the product detail page via which the product purchase was made using a URI that includes a reference tag associated with the messaging application provider and a user token associated with a user (e.g., a sender who sent the product card 328 to the recipient).

At block 606, the service provider server 202 may attribute the product purchase to the messaging application based on the reference tag. At block 608, the service provider server 202 may generate compensation data 334 indicating an amount of compensation that the messaging application provider is to receive based on the product purchase and may transmit the compensation data 334 to the third-party messaging application server 204.

At block 610, the service provider server 202 may determine whether the user can be identified based on the token included in the URI. A positive determination may occur at block 610 if, for example, the token was previously generated by the service provider server 202 as part of an authentication with the messaging application via the server provider server 202 in response to selection of widget 316. In response to a positive determination at block 612, the service provider server 202 may attribute the product purchase to the user associated with the user token and generate and associate compensation data with an account of the user maintained by the service provider server 202. The compensation data may indicate an amount of compensation the user (e.g., the sender of the product card 328 that the purchaser interacted with) is to receive based on the product purchase.

On the other hand, in response to a negative determination at block 610, the method 600 may proceed to block 614, where the service provider server 202 may transmit the user token 326 to the messaging application server 204. In certain example embodiments, the service provider server 202 may have generated the user token 326 and provided it to the messaging application server 204 as part of the product data 320, and the messaging application server 204 may have stored the token 326 in association with a corresponding sender's account. Alternatively, the messaging application server 204 may have generated the token and provided it the service provider server 202 and the service provider server 202 may have provided the token 326 back to the messaging application 204 as part of the URI 322 included in the product data 320. In either case, in certain example embodiments, the messaging application server 204 may identify a sender's account with which the token 326 is associated and may generate compensation data indicating an amount of compensation the messaging application provider provides to the sender for the product purchase. In certain other example embodiments, the messaging application server 204 may identify a sender's account associated with the token 326 and may transmit identifying information for the sender to the service provider server 202. If the service provider server 202 is able to locate a user account that it maintains based on the identifying information, the service provider server 202 may generate compensation data and associate it with the user account. As shown in stage 312 of the event flow in FIG. 3, an indication of the compensation for the product purchase may be provided to the sender.

One or more operations of the methods 400-600 may have been described above as being performed by a messaging application server 204, a user device, a service provider server 202, or more specifically, by one or more program modules, applications, or the like executing on such devices. It should be appreciated, however, that any of the operations of methods 400-600 may be performed, at least in part, in a distributed manner by one or more other devices, or more specifically, by one or more program modules, applications, or the like executing on such other devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 400-600 may be described in the context of the illustrative architecture depicted in FIG. 2, it should be appreciated that such operations may be implemented in connection with numerous other device configurations and architectures.

Figure 5:
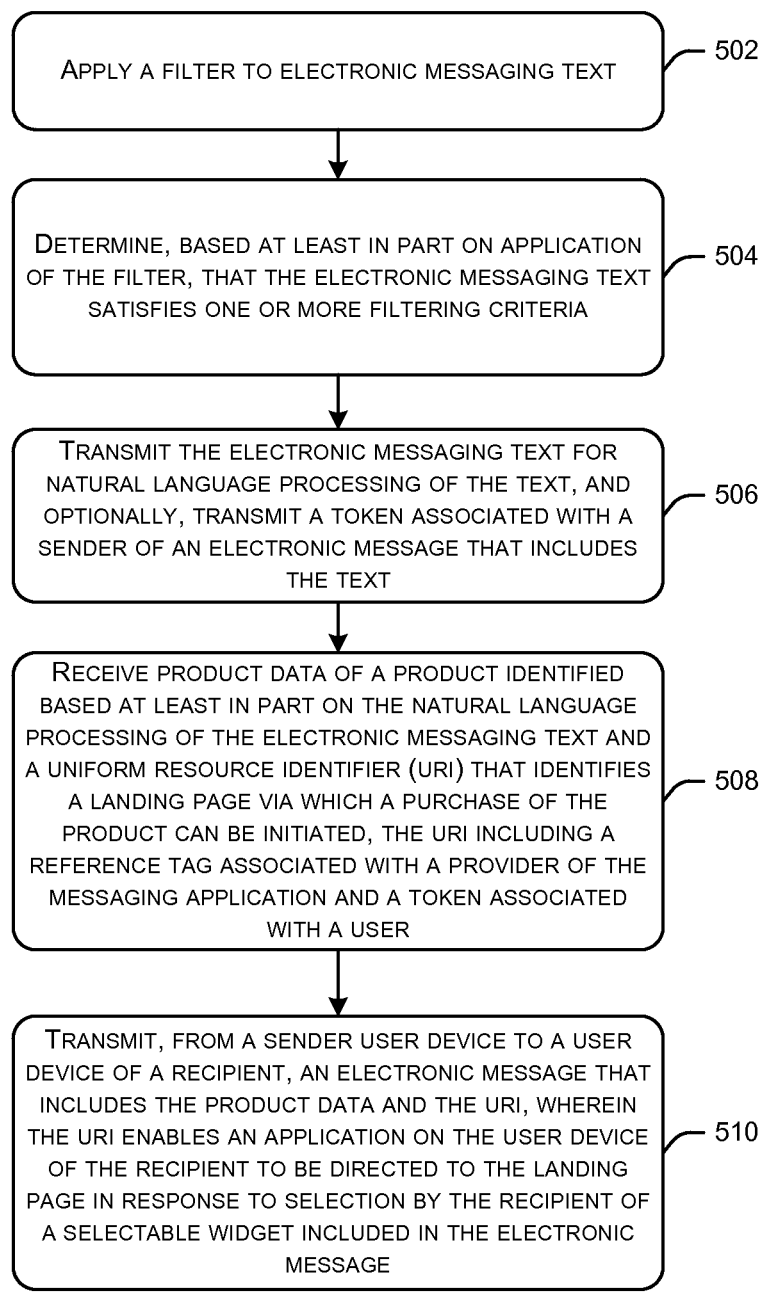
FIG. 5 is a process flow diagram of an illustrative method for i) filtering electronic message text to identify text to which natural language processing is to be applied to determine a semantic context of the text and one or more candidate products relevant to the semantic context and ii) receiving product data for the candidate product(s) that may be automatically included in a message stream or provided to a user who may, in turn, generate and transmit an electronic message that includes the product data in accordance with one or more example embodiments of the disclosure.

The operations described and depicted in the illustrative methods of FIGS. 4-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example of programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
receiving, by one or more computer processors, from a first device, first natural language text input data, wherein the first natural language text input data is associated with a first message from a first user profile in an electronic messaging conversation on the first device;

receiving, by the one or more computer processors, from a second device, second natural language text input data, wherein the second natural language text input data is associated with a second message from a second user profile in the electronic messaging conversation on the second device;

receiving, by the one or more computer processors, from the first device, third natural language text data, wherein the third natural language text data is associated with voice input data received by the first device and associated with the first user profile in the electronic messaging conversation on the first device;

performing, by the one or more computer processors, natural language processing on at least a portion of the third natural language text data to generate output data indicative of semantic context of the third natural language text data;

determining, by the one or more computer processors, at least one product is related to the semantic context;

determining compensation data indicating an amount of compensation for a purchase;

identifying, based on a reference tag, a messaging application, wherein the first message was generated using the messaging application;

generating, by the one or more computer processors, a selectable representation of the at least one product, wherein the selectable representation comprises a network resource identifier;

determining, based on the reference tag, that the first user profile used the messaging application to select the network resource identifier;

associating the compensation data with the messaging application; and sending, by the one or more computer processors, the selectable representation to the first device, wherein the selectable representation is presented in the electronic messaging conversation on the first device.

2. The method of claim 1, wherein the electronic messaging conversation is associated with an electronic messaging application on the first device associated with the first user profile and the second device associated with the second user profile.

3. The method of claim 1, wherein determining the at least one product comprises determining that the at least one product based at least in part on contextual data associated with the first device associated with the first user profile, wherein the contextual data comprises geo-location data indication a geographical location of the first device.

4. The method of claim 1, wherein the at least one product is a candidate product or service available for purchase, and wherein determining the at least one product comprises determining the at least one product from a predetermined group of products or services available for sale in an electronic marketplace.

5. The method of claim 1, further comprising:
receiving, by the one or more computer processors, from the first device, an indication of a selection of the at least one product;
sending, by the one or more computer processors, the selectable representation to the second device.

6. The method of claim 5, further comprising:
receiving a request for a representation of a network resource associated with the network resource identifier, wherein the request is received from an electronic messaging application executing on the second device associated with the second user profile, wherein the second device received a third message comprising the selectable representation;
determining, by the one or more computer processors, that the request is associated with the network resource identifier;
determining a user token included in the network resource identifier, wherein the user token is associated with the second user profile; and
attributing the purchase to the user token.

7. The method of claim 6, further comprising:
sending an indication of the purchase to an electronic messaging application server, wherein the indication comprises the user token, and wherein the indication associates the compensation data with the second user profile.

8. The method of claim 6, wherein the second user profile is associated with a sender of the second message in the electronic messaging conversation or a recipient of the first message in the electronic messaging conversation.

9. A system, comprising:
at least one memory storing computer-executable instructions; and
at least one processor communicatively coupled to the at least one memory and configured to access the at least one memory and execute the computer-executable instructions to:
receive, from a first device, first natural language text input data, wherein the first natural language text input data is associated with a first message from a first user profile in an electronic messaging conversation on the first device;
receive, from a second device, second natural language text input data, wherein the second natural language text input data is associated with a second message from a second user profile in the electronic messaging conversation on the second device;
receiving, by the at least one processor, from the first device, third natural language text data, wherein the third natural language text data is associated with voice input data received by the first device and associated with the first user profile in the electronic messaging conversation on the first device;
perform natural language processing on at least a portion of the third natural language text data to generate output data indicative of semantic context of the third natural language text data;
determine at least one product is related to the semantic context;
determine compensation data indicating an amount of compensation for a purchase;
identify, based on a reference tag, a messaging application, wherein the first message was generated using the messaging application;
generate a selectable representation of the at least one product based at least in part on the semantic context, wherein the selectable representation comprises a network resource identifier;
determine, based on the reference tag, that the first user profile used the messaging application to select the network resource identifier;
associate the compensation data with the messaging application; and send the selectable representation to the first device, wherein the selectable representation is presented in the electronic messaging conversation on the second device.

10. The system of claim 9, wherein the at least one processor is further configured to execute the computer-executable instructions to:
receiving from the first device, an indication of a selection of the at least one product;
sending the selectable representation to the second device.

11. The system of claim 10, wherein the at least one processor is further configured to execute the computer-executable instructions to:
receive a request for a network resource associated with the network resource identifier, wherein the request is received from an electronic messaging application executing on the second device associated with the second user profile, wherein the second device received a third electronic message comprising the network resource identifier;
determine that the request is associated with the network resource identifier;
determine a user token included in the network resource identifier, wherein the user token is associated with the second user profile; and
attribute the purchase associated with the network resource identifier to the user token.

12. A method, comprising:
receiving, by one or more processors, from a first device, first natural language text input data, wherein the first natural language input text data, wherein the first natural language input text data is associated with a first message from a first user profile in an electronic messaging conversation on the first device;
receiving, by the one or more processors, from a second device, second natural language text input data, wherein the second natural language text input data is associated with a second message from a second user profile in the electronic messaging conversation on the second device;
receiving, by the one or more processors, from the first device, third natural language text data, wherein the third natural language text data is associated with voice input data received by the first device and associated with the first user profile in the electronic messaging conversation on the first device;
performing, by the one or more processors, natural language processing on at least a portion of the third natural language text data to generate output data indicative of semantic context of the third natural language text data;
determining, by the one or more processors, at least one product is related to the semantic context;
identifying, by the one or more processors, a reference tag associated with at least one of the first message or the second message;
determining compensation data indicating an amount of compensation for a purchase;
identifying, based on the reference tag, a messaging application, wherein the first message was generated using the messaging application;
generating, by the one or more processors, based at least in part on the identification of the reference tag, a product card comprising product data of the at least one product, wherein the product data comprises a selectable resource identifier;
determine, based on the reference tag, that the first user profile used the messaging application to select the resource identifier;
associate the compensation data with the messaging application; and
sending, by the one or more processors, the product card to the second device, wherein the product card is configured to be included in the electronic messaging conversation on the second device.

13. The method of claim 12, the method further comprising:
receiving an indication of the purchase initiated by the first user profile or the second user profile and associated with the at least one product; and
attributing the purchase to the reference tag.

14. The method of claim 12, wherein the first message is a voice message.

* * * * *